(12) United States Patent
Ionov

(10) Patent No.: US 6,901,177 B2
(45) Date of Patent: May 31, 2005

(54) OPTICAL TOP HAT PULSE GENERATOR

(75) Inventor: Stanislav I. Ionov, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 275 days.

(21) Appl. No.: 10/341,689

(22) Filed: Jan. 13, 2003

(65) Prior Publication Data

US 2003/0219195 A1 Nov. 27, 2003

Related U.S. Application Data

(60) Provisional application No. 60/383,343, filed on May 23, 2002.

(51) Int. Cl.$^7$ ................................................. G02B 6/26
(52) U.S. Cl. ............................ 385/15; 385/27; 385/32; 385/39
(58) Field of Search ............................. 385/15–16, 27, 385/39, 122, 31–32, 24, 95–97

(56) References Cited

U.S. PATENT DOCUMENTS

| | | | |
|---|---|---|---|
| 5,208,455 A | 5/1993 | Nelson et al. | 250/227.19 |
| 5,717,797 A | 2/1998 | Evans | 385/27 |
| 6,424,773 B1 * | 7/2002 | Watanabe | 385/122 |
| 6,462,860 B1 | 10/2002 | Ionov | 359/325 |

FOREIGN PATENT DOCUMENTS

| EP | 0 521 671 A2 | 1/1993 |
|---|---|---|
| WO | 01/95526 A2 | 12/2001 |

OTHER PUBLICATIONS

U.S. Appl. No. 10/735,071, filed Dec. 12, 2003, Ionov.
Agraval, G.P., "Optical Solitons," *Nonlinear Fiber Optics*, Chapter Five, Academic Press, New York, pp. 133–152 (1995).
Bigo, S., et al., "All–Optical Fiber Signal Processing and Regeneration for Soliton Communications," *IEEE Journal of Selected Topics in Quantum Electronics*, vol. 3, No. 5, pp 1208–1222 (Oct. 1997).
Wang, D., et al., "Nonlinear Optical Loop Mirror Based n Standard Communication Fiber," *Journal of Lightwave Technology*, vol. 15, No. 4, pp 642–646 (Apr. 1997).

* cited by examiner

Primary Examiner—Frank G. Font
Assistant Examiner—Michael P. Mooney
(74) Attorney, Agent, or Firm—Ladas & Parry LLP

(57) ABSTRACT

An optical top hat pulse generator controlled by solitons. The top hat generator comprises a non-linear optical loop mirror (NOLM) that is fed by a continuous wave (CW) optical signal and is controlled by incoming optical pulses comprising first order solitons. The soliton regime for the incoming optical pulses is obtained by choosing a fiber with the correct dispersion and by adjusting the peak power of the control pulses.

40 Claims, 7 Drawing Sheets

OPTICAL TOP HAT PULSE GENERATOR

CROSS REFERENCE TO RELATED APPLICATIONS

The present document is related to and claims benefit from the copending and commonly assigned provisional patent application entitled: "An Optical Top Hat Pulse Generator," Ser. No. 60/383,343, filed on May 23, 2002. The content of this related application is hereby incorporated by reference herein. Additionally, the subject matter of the present application may also be related to the following U.S. patent application: "Method and Apparatus for Optical Top-Hat Pulse Generation," Ser. No. 10/735,071, filed Dec. 12, 2003.

BACKGROUND

1. Field

The present invention relates to coherent detection of pulse position modulated signals. More particularly, the present invention relates to a top hat optical pulse generator for use within a pulse position modulation receiver.

2. Description of Related Art

Many satellite and terrestrial optical communication systems require transmission of analog optical signals. The straightforward way to address this need is to modulate the amplitude of an optical carrier. This approach, however, suffers from poor signal-to noise ratio (SNR). It is well known that broadband modulation techniques, which utilize higher bandwidth than that of the transmitted waveform, may improve the SNR over that achieved with amplitude modulation. Pulse Position Modulation (PPM) is one of these techniques. In PPM, a temporal shift in the pulse position represents a sample of the transmitted waveform. The improvement in SNR near the Nyquist sampling frequency of a pulse position modulated signal over an amplitude modulated signal is shown below:

$$SNR_{ppm} \infty SNR_{am}(t_p/\tau)^2 \qquad \text{Eq.(1)}$$

where $t_p$ is the temporal spacing between unmodulated pulses and $\tau$ is the pulse duration, respectively.

Conventional detection or demodulation of analog PPM optical signals, though, suffers from poor SNR at low frequencies. PPM signals are usually demodulated from the optical to electronic domain by a photodiode followed by a lowpass filter (LPF) that converts pulse position modulation to amplitude modulation. Such a demodulation technique is not capable of recovering the DC component, since the DC component is represented by a constant temporal shift of all pulses from their unmodulated positions. Moreover, the demodulated signals after the lowpass filter have very low amplitude at low frequencies. The amplitude increases linearly with frequency up to the Nyquist limit. Such frequency-dependent distortion is corrected by an integration circuit, which amplifies low-frequency noise accordingly, resulting in decreased SNR performance.

An apparatus and method for detecting an optical PPM signal are described in commonly-owned U.S. Pat. No. 6,462,860, issued to Ionov on Oct. 8, 2002, incorporated herein by reference. This patent application describes coherent wavelength converters that are used to generate preferably top hat shaped optical pulses. Top hat shaped optical pulses are preferred in the apparatus and method described in U.S. Pat. No. 6,462,860, since such pulses provide for better linearity of the detected optical PPM signal. Top hat shaped optical pulses may also be used in other optical systems known in the art. However, U.S. Pat. No. 6,462,860 describes the generation of top hat shaped pulses with zero dispersion fiber. Zero dispersion fiber is not generally commercially available. Therefore, there exists a need in the art for an optical pulse generator that can generate optical pulses with a top hat shape without requiring the use of zero dispersion fiber.

SUMMARY

An advantage of embodiments of the present invention is to provide an apparatus and method for generating optical pulses with a top hat shape. An additional advantage of embodiments of the present invention is to provide a method and apparatus for the detection of pulse position modulated optical signals using optical top hat pulse generators. These advantages and others are obtained without requiring the use of zero dispersion fiber.

An optical top hat pulse generator according to embodiments of the present invention comprises a non-linear optical loop mirror (NOLM) that is fed by a continuous wave (CW) optical signal and is controlled by incoming optical pulses comprising first order solitons. The soliton regime for the incoming optical pulses is obtained by choosing a fiber with the correct dispersion and by adjusting the peak power of the control pulses. The use of soliton control helps assure no spread of the control pulse, since the shape of the control pulse is maintained by fiber nonlinearity.

A first embodiment of the present invention provides a top hat pulse generator receiving a continuous wave optical signal at a first wavelength and a pulsed optical signal at a second wavelength and generating top hat optical pulses at the first wavelength, the top hat pulse generator comprising: an optical coupler having a first side with a first arm and a second arm and a second side having a third arm and a fourth arm, the first arm adapted to receive the continuous wave optical signal and to launch the continuous wave optical signal into the third arm and the fourth arm; an optical fiber having a first end and a second end, the first end disposed to receive optical energy from the third arm and to transmit optical energy to the third arm and the second end disposed to receive optical energy from the fourth arm and to transmit optical energy to the fourth arm, the optical fiber having a positive dispersion supporting optical solitons; an optical filter receiving optical energy from the second arm; and a control pulse coupler positioned to launch optical energy into the optical fiber, the control pulse coupler having an input adapted to receive the pulsed optical signal, wherein the pulsed optical signal has an optical peak power and the optical peak power is controlled to that of a first order soliton.

Another embodiment of the present invention provides a method for converting optical pulses at a first optical wavelength to top hat optical pulses at a second optical wavelength comprising the steps of: generating a continuous wave optical signal at the second optical wavelength; launching counter-propagating beams of the continuous wave optical signal into a loop of optical fiber from a coupler, the optical fiber having a positive dispersion supporting optical solitons and the counter-propagating waves interfering at the coupler; launching the optical pulses into the loop of optical fiber, the optical pulses having a peak optical power; controlling the peak optical power to a power of a first order soliton; coupling optical energy out of said optical fiber at said coupler; and filtering the optical energy to suppress optical energy at the first optical wavelength and to pass optical energy at the second optical wavelength to produce top hat optical pulses at the second optical wavelength.

Still another embodiment of the present invention provides an apparatus for detecting a pulse position modulated optical signal comprising: a clock source providing a pulsed optical clock signal synchronized to the pulse position modulated optical signal; a continuous wave optical source producing a continuous wave optical signal; a first optical top hat pulse generator receiving the continuous wave optical signal and the pulse position modulated signal and producing a first optical top hat output signal, wherein a peak power of the pulse position modulated signal is adjusted to that of a first order soliton; a second optical top hat pulse generator receiving the continuous wave signal and the pulsed optical clock signal and producing a second optical top hat output signal, wherein a peak power of the pulsed optical clock signal is adjusted to that of a first order soliton; and an overlap-to-electric converter receiving the first optical top hat signal and the second optical top hat signal and producing an electric signal proportional to an overlap amount between the first optical top hat signal and the second optical top hat signal.

Yet another embodiment of the present invention provides a method for detecting a pulse position modulated signal comprising the steps of: receiving the pulse position modulated optical signal; providing a stream of optical clock pulses; generating a continuous wave optical signal having an optical wavelength different than an optical wavelength of the pulse position modulated signal or the optical clock pulses; applying the continuous wave optical signal to a first non-linear optical loop mirror; coupling the pulse position modulated optical signal into said first non-linear optical loop mirror; controlling a peak power of the pulse position modulated optical signal to be at a power of a first order soliton; applying the continuous wave optical signal to a second non-linear optical loop mirror; coupling the stream of optical clock pulses into the second non-linear optical loop mirror; controlling a peak power of the stream of optical clock pulses to be at a power of a first order soliton; coupling a first output optical signal out of the first non-linear optical loop mirror; filtering the first output optical signal with a filter that transmits around the optical wavelength of said continuous wave optical signal and rejects around the optical wavelength of the pulse position modulated signal to produce a first top hat signal; coupling a second output optical signal out of the second non-linear optical loop mirror; filtering the second output optical signal with a filter that transmits around the optical wavelength of the continuous wave optical signal and rejects around the optical wavelength of the optical clock pulses to produce a second top hat signal; detecting the amount of overlap between the first top hat signal and the second top hat signal; and producing an electrical signal proportional to the amount of overlap.

DETAILED DESCRIPTION

Embodiments of the present invention now will be described more fully hereinafter with reference to the accompanying drawings, in which preferred embodiments of the invention are shown. The invention may be embodied in many different forms and should not be construed as limited to the embodiments set forth herein.

Figure 1:
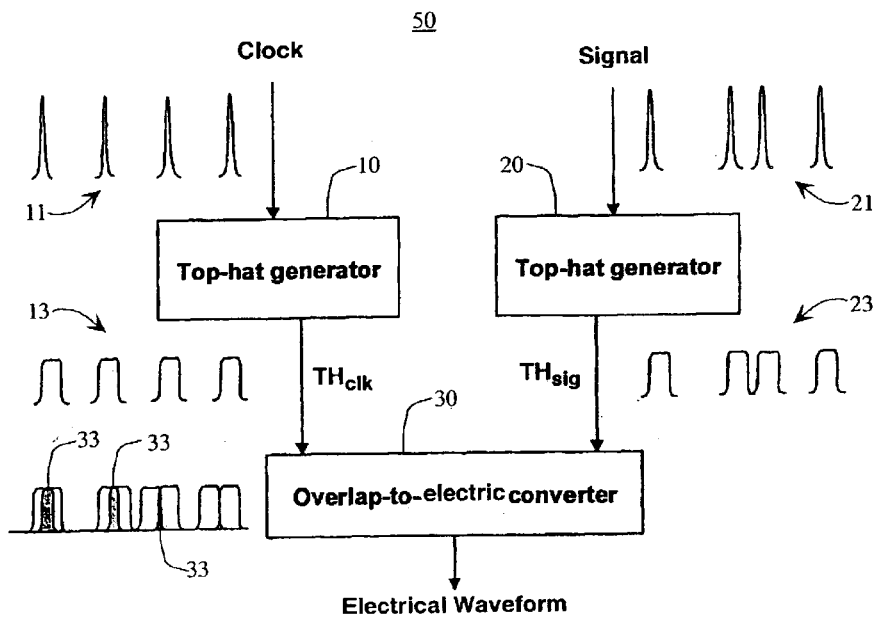
FIG. 1 shows a block diagram of an optical pulse position modulation receiver in accordance with the present invention.

FIG. 1 depicts an optical receiver 50 that detects optical pulse position modulated signals and converts the detected pulses to an electrical waveform. The optical receiver receives both short optical clock pulses 11 and short pulse position modulated optical pulses 21. The short optical clock pulses 11, which have a fixed period, are converted to rectangular clock pulses 13 by, preferably, a first top hat generator 10. The short optical signal pulses 21, which vary in temporal position according to the modulated optical signal, are converted to rectangular signal pulses 23 by, preferably, a second top hat generator 20. An overlap-to-electric converter 30 detects the amount of overlap 33 between the rectangular clock pulses 13 and the rectangular signal pulses 23 and converts the overlap amount 33 into an electrical signal. The overlap amount is a measure of the delay between the optical clock pulses 11 and the pulse position modulated signal pulses 21. The overlap-to-electric converter 30 may comprise a coherent correlator, a sum frequency generator, a four-wave mixer, or other means that can measure the amount of overlap between separate streams of rectangular pulses and output the measured amount as an electrical signal.

Figure 4A:
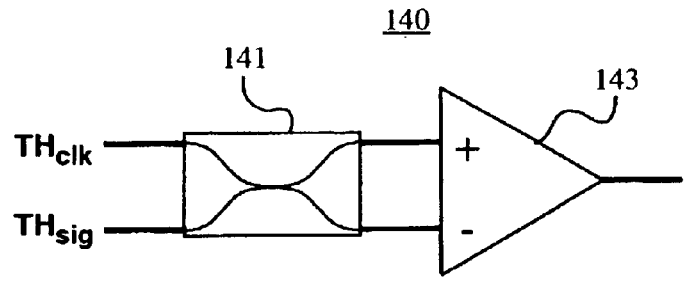
FIG. 4A (prior art) shows a schematic diagram of an optical correlator for use in the receiver depicted in FIG. 2.
Figure 4B:
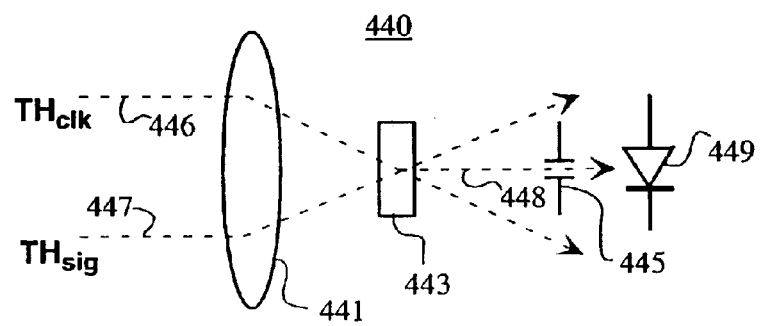
FIG. 4B (prior art) depicts a sum frequency generation apparatus for performing overlap to electric conversion.
Figure 4C:
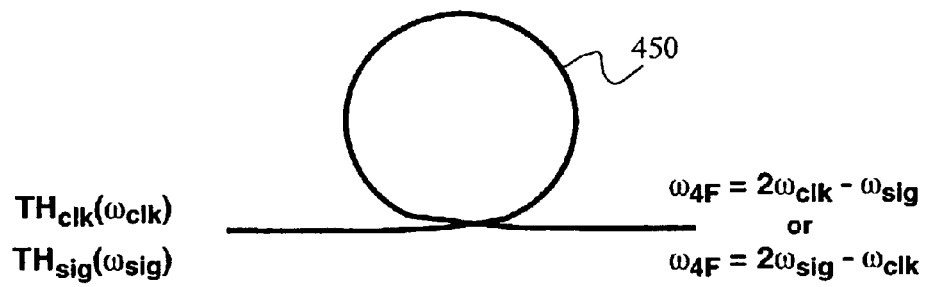
FIG. 4C (prior art) depicts a four-wave mixing apparatus for performing overlap to electric conversion.

As noted above, overlap to electric conversion may be achieved by any of several methods known in the art. For example, an exemplary coherent correlator 140 is shown in FIG. 4A and described in additional detail below, in relation to the circuit depicted in FIG. 2. The overlap-to-electric converter 30 may also comprise a sum frequency generator or a four-wave mixer. Sum frequency generators are well-known in the art. An exemplary sum frequency generator is depicted in FIG. 4B and described in additional detail below. An exemplary four-wave mixing apparatus is depicted in FIG. 4C and described in additional detail below. However, those skilled in the art will understand that additional methods and apparatus may be used to provide overlap to electric conversion. The description of the specific apparatus and methods herein should not be construed to limit embodiments of the present invention to these apparatus and methods.

Figure 2:
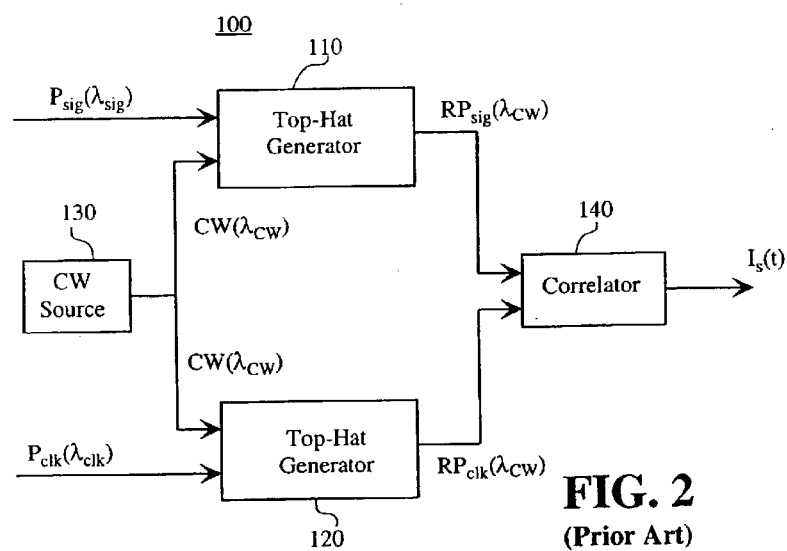
FIG. 2 (prior art) shows a block diagram of an optical pulse position modulation receiver using correlation of top hat pulses to provide an electrical output.

The apparatus and method for detecting an optical PPM signal described in U.S. Pat. No. 6,462,860 uses a coherent correlator for an overlap-to-electric converter. FIG. 2 depicts an embodiment of the optical receiver 100 described in U.S.

Pat. No. 6,462,860. In FIG. 2, a first top hat generator 110 receives a pulse position modulated optical signal $P_{sig}(\lambda_{sig})$ and a continuous wave optical signal $CW(\lambda_{CW})$, and produces a rectangular signal pulse output $RP_{sig}(\lambda_{CW})$. Still referring to FIG. 2, a second top hat generator 120 receives a pulsed optical clock signal $P_{clk}(\lambda_{CW})$ and the continuous wave optical signal $CW(\lambda_{CW})$, and produces a rectangular clock pulse output $RP_{clk}(\lambda_{CW})$. A continuous wave source 130 provides the continuous wave optical signal $CW(\lambda_{CW})$. An optical pulse source (not shown) provides the pulsed optical clock signal $P_{clk}(\lambda_{clk})$ such that the optical pulses in the pulsed optical clock signal $P_{clk}(\lambda_{clk})$ are preferably equally spaced or nearly equally spaced in time. Optical pulse sources providing pulsed optical signals are known in the art. The PPM optical signal $P_{sig}(\lambda_{sig})$ and the pulsed optical clock signal $P_{clk}(\lambda_{clk})$ may have the same or different optical wavelengths. In the embodiment depicted in FIG. 2, the rectangular signal pulse output $RP_{sig}(\lambda_{CW})$ and the rectangular clock pulse output $RP_{clk}(\lambda_{CW})$ are synchronized and are coherent since both derive their optical frequency and phase from that of a single continuous-wave source.

Still referring to FIG. 2, a coherent correlator 140 receives the rectangular signal pulse output $RP_{sig}(\lambda_{CW})$ and the rectangular clock pulse output $RP_{clk}(\lambda_{CW})$ and produces a current output $I_s(t)$. The output $I_s(t)$ of the coherent correlator 140 is proportional to the cross-correlation product of the rectangular signal pulse output $RP_{sig}(\lambda_{CW})$ and the rectangular clock pulse output $RP_{clk}(\lambda_{CW})$. This cross-correlation product is also proportional to the offset in time between each PPM pulse and its corresponding clock pulse. Thus, the output of the coherent correlator 140 provides a demodulated analog signal corresponding to the original analog pulse position modulated signal.

The top hat generators 110, 120 of the present invention each preferably comprise a nonlinear optical loop mirror (NOLM) with a control loop. NOLMs are well known in the art and can be constructed by splicing together commercial fibers and couplers. U.S. Pat. No. 5,208,455, issued to B. P. Nelson et al. on May 4, 1993, describes the construction of a typical nonlinear optical loop mirror. Non-linear optical loop mirrors are also further described by S. Bigo, O. Leclerc, and E. Desurvire in "All Optical Fiber Signal Processing and Regeneration for Soliton Communications," IEEE J. Sel. Topics Quant. Electron., Vol. 3 (1997), p 1208.

Figure 3:
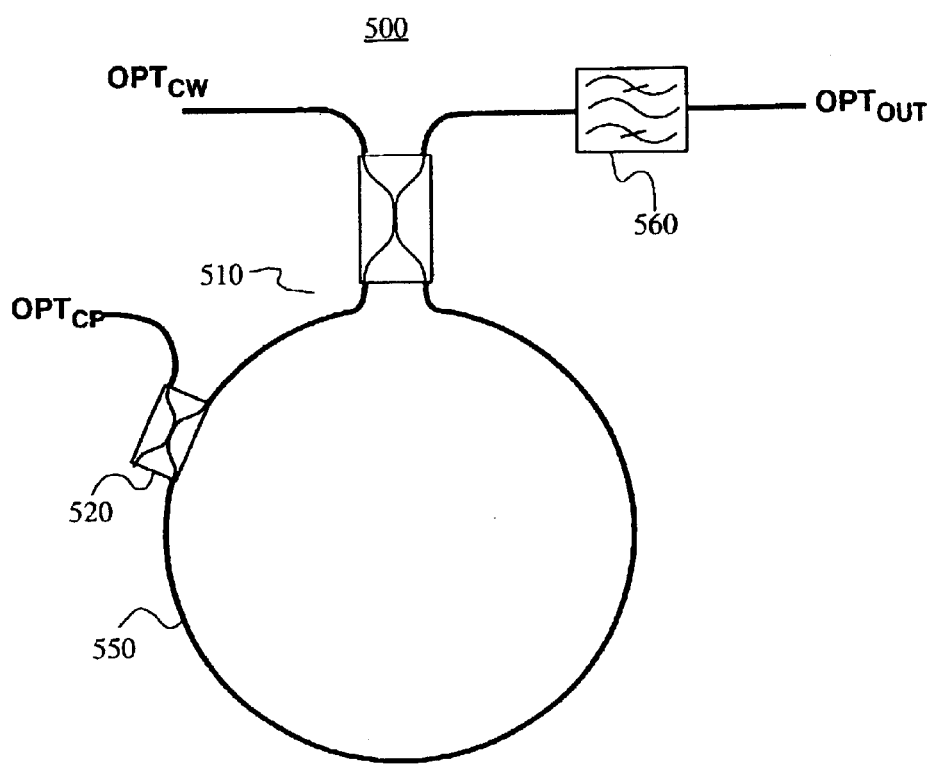
FIG. 3 (prior art) shows a schematic representation of a typical non-linear optical loop mirror.

FIG. 3 depicts a typical NOLM 500. The NOLM 500 comprises a first coupler 510 for coupling a continuous wave optical signal $OPT_{CW}$ into the NOLM 500 and a second coupler 520 for coupling an optical control pulse $OPT_{CP}$ into the NOLM 500. The optical loop of the NOLM is formed by an optical fiber 550 that is routed from one branch of the first coupler 510 to another branch of the first coupler 510. A filter 560 may be disposed at another branch of the first coupler 510 to filter out signals at the optical wavelength of the optical control pulse, while allowing signals at the optical wavelength of the continuous wave optical signal to pass from the NOLM 500.

Returning to FIG. 2, the single frequency continuous wave source 130 operating at an optical wavelength $\lambda_{cw}$ feeds into the top hat generators 110, 120 comprising NOLMs. Both NOLMs are preferably completely symmetrical so that the continuous wave radiation is reflected completely in the absence of control radiation. The signal and clock pulses at wavelengths $\lambda_{sig}$ and $\lambda_{clk}$, respectively, act as control signals in the NOLMs. For the NOLMs to operate correctly, the wavelengths of the control signals $\lambda_{sig}$ and $\lambda_{clk}$ must be different than that of the continuous wave radiation at $\lambda_{cw}$. If properly configured, the NOLMs preferably provide pulses with top hat temporal shapes.

As shown in FIG. 2, the coherent trains of rectangular signal $RP_{sig}(\lambda_{CW})$ and clock pulses $RP_{clk}(\lambda_{CW})$ at the continuous wave frequency $\lambda_{cw}$ are combined in the optical correlator 140. Preferably, the optical correlator 140 consists of a 3 dB coupler 141 and a balanced detector 143, as shown in FIG. 4A. The electric current of the correlator is given by:

$$I = \int_{-\infty}^{\infty} E_{sig}(t - \Delta t) E_{clk}(t)\, dt \qquad \text{Eq. (2)}$$

where $\Delta t$ is the temporal shift between the signal and control pulses and $E_{sig,clk}(t)$ is the temporal shape of the rectangular pulses.

As briefly mentioned above, an optical correlator is one way to provide the overlap-to-electric converter used in embodiments of the present invention. However, a sum frequency generation apparatus 440, as shown in FIG. 4B, may also be used. Such circuits are well-known in the art. The sum frequency apparatus 440 comprises a lens 441 for focusing beams comprising the top hat pulses of the clock $TH_{clk}$ 446 and the signal $TH_{sig}$ 447 into a non-linear crystal 443. The non-linear crystal may comprise lithium niobate. The two beams 446, 447 are directed through the non-linear crystal 443, where they produce sum-frequency beam 448, which propagates within the sector between the two beams 446, 447 to an aperture 445. The sum-frequency radiation is generated only when the clock pulses and the signal pulses overlap in time. Therefore, the electric current from the photodetector 449 is proportional to the amount of overlap.

Four-wave mixing may also be used to provide the requisite overlap to electric conversion. FIG. 4C depicts a four-wave mixing apparatus well known in the art. The top hat pulses of the clock $TH_{clk}$ at a wavelength $\omega_{clk}$ and the signal $TH_{sig}$ at a wavelength $\omega_{sig}$ are directed into a single mode fiber 450, which is preferably dispersion shifted fiber. Preferably, the length of the fiber should be below the fiber dispersion length for the top hat pulses. Four-wave mixing occurs within the fiber 450 to produce a signal at a wavelength $\omega_{4F}=2\omega_{clk}-\omega_{sig}$ or $\omega_{4F}=2\omega_{sig}-\omega_{clk}$. A photodetector may then be used to detect and convert the four-wave output signal to an electric signal that is proportional to the overlap between the clock and signal pulses.

Figure 5:
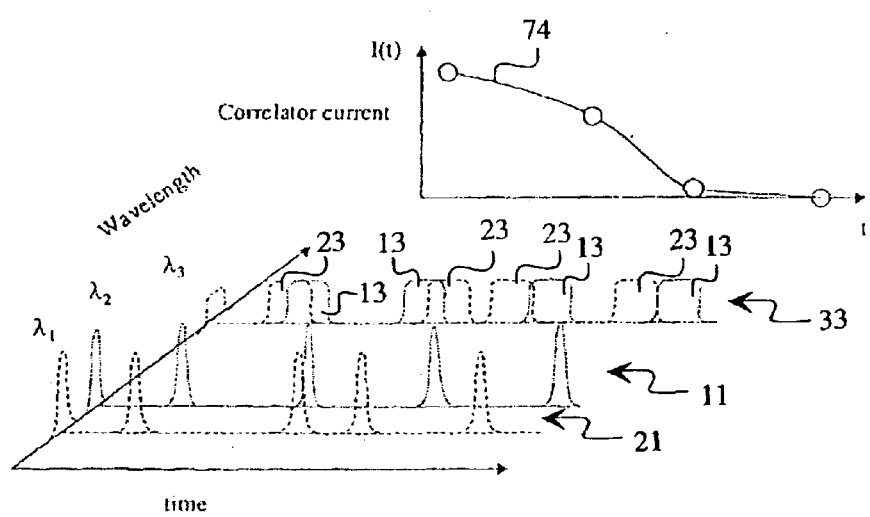
FIG. 5 shows a graphical view of the transformation of the optical pulses to a current output by the top hat pulse generators and correlator depicted in FIG. 2.

FIG. 5 show the relationship between the input optical clock pulses 11 and the pulse position modulated signal pulses 2 1and the correlator current 74 produced by the optical correlator 140 depicted in FIG. 2. As shown in FIG. 5, the greater the overlap 33 between the rectangular clock pulses 13 and the rectangular signal pulses 23, the greater the correlator current 74 produced by the optical correlator 140. Of course, as noted above, devices other than an optical correlator may be used to detect the overlap 33 and to output an electrical signal based on the overlap.

In the embodiment shown in FIG. 2, the rectangular pulse created by a specific PPM pulse should not overlap the rectangular pulse created by a clock pulse for a preceding or a following PPM period. Therefore, the maximum temporal shift for PPM pulses $\Delta t_{P_{max}}$ should be smaller than the duration of the rectangular pulses ITH created by the top hat generators, and the sum of the two values, $\Delta t_{P_{max}} + t_{TH}$, must be less than $t_p$, the interval between the clock pulses. Hence, $\Delta t_{P_{max}} < t_p/2$, so the PPM signal should have a modulation index M of less than 0.5. Therefore, the individual pulses of the PPM signal are shifted from their non-modulated positions of $\Delta t_0 = t_p/4$ within the time slot of $-t_p/4 < \Delta t < t_p/4$.

The linearity of an optical PPM receiver using top hat generators, whether using the coherent detection technique described above and shown in FIG. 2 or other techniques or apparatus, depends on the quality of the rectangular pulses generated by the top hat generators. The quality of the rectangular pulses is essentially the closeness of the shape of the generated pulses to a true "top hat" shape. When a NOLM is used to generate the rectangular pulse, the control pulse, which imprints a non-linear phase shift on the co-propagating CW beam as described above, preferably retains its shape along the whole length of the NOLM.

A NOLM comprising a fiber having a dispersion that is zero at the wavelength of the control pulse, either signal or clock, is discussed in U.S. Pat. No. 6,462,860. However, this restriction on fiber dispersion may be hard to meet, since most commercial off-the-shelf fibers do not have this capability. Moreover, even if such fibers are readily available, the control pulse would still suffer some shape degradation due to higher-order dispersion and self-phase modulation.

It is well known in the art that optical solitons preserve their temporal shape during propagation. Therefore, if a NOLM is controlled with a soliton control pulse, the output of the NOLM should comprise an optical pulse output that has a leading edge, a trailing edge and an intermediate plateau that provides for a true "top hat" shape. Hence, it is preferred that optical PPM receivers according to the present invention have top hat pulse generators that comprise NOLMs that are controlled by first order solitons. Further, using first order solitons, a fiber with positive dispersion (in ps/nm×km) supporting optical solitons should be used. The soliton regime for the control pulse is achieved by (i) choosing a fiber with the correct, i.e., positive, dispersion sign and (ii) adjusting the peak power of the control pulse inside the loop to that of the first order soliton, as shown below:

$$P_c = \frac{|\beta_2|}{\gamma t_0^2} = \frac{3.11|\beta_2|}{\gamma t_{FWHM}^2} = \frac{3.11\lambda^2 D}{2\pi c \gamma t_{FWHM}^2} \qquad \text{Eq. (3)}$$

where $\gamma \approx 1.5-10$ $W^{-1}$/km is the non-linear fiber constant, $t_{FWHM} = 2\ln(\sqrt{2}-1)t_0$ is the optical pulse duration (full width half maximum), c is the speed of light and D is the fiber dispersion. Also, in equation (3), $\beta_2$ is the fiber dispersion (in $s^2$/cm) at the wavelength $\lambda$ of the control pulse.

Figure 6:
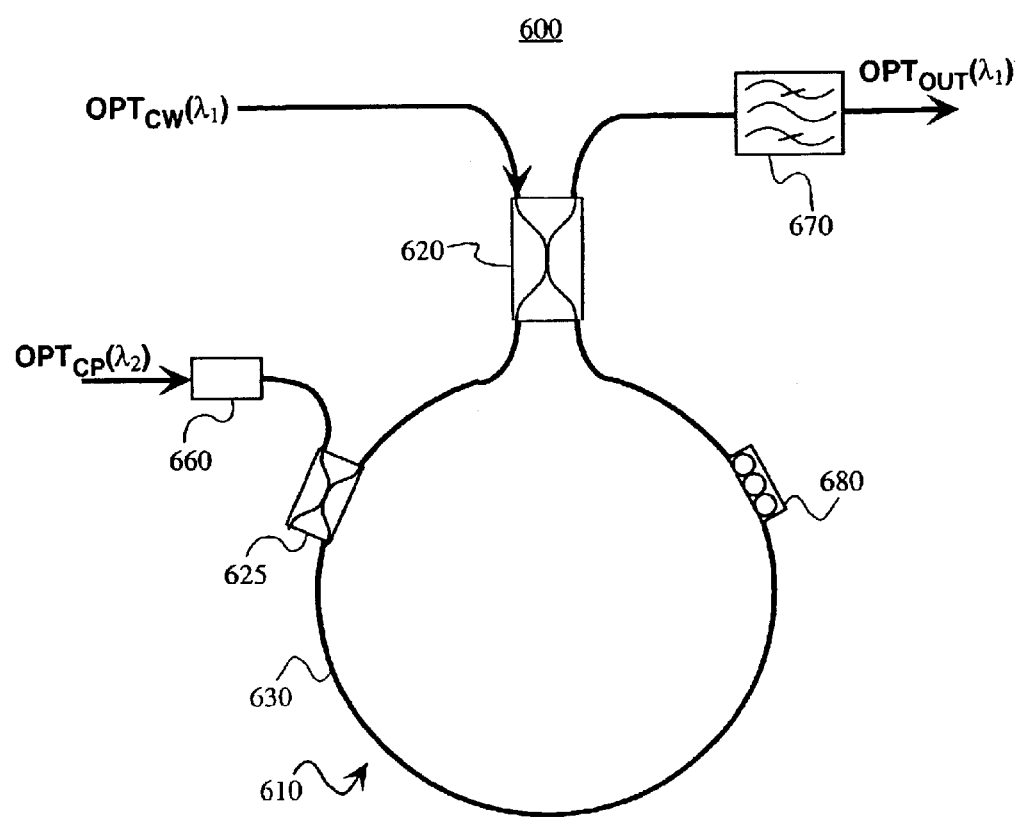
FIG. 6 shows a block diagram of an embodiment of a top hat generator controlled by first order solitons according to an embodiment of the present invention.

A top hat generator 600 comprising a NOLM 610 controllable by a first order soliton is shown in FIG. 6. In FIG. 6, a coupler 620, preferably a 3 dB coupler, receives a continuous wave optical signal at optical wavelength $\lambda_1$ at a first arm on a first side of the coupler 620 and launches two counter-propagating beams into a fiber loop 630 from the two arms on the second side of the coupler 620. The fiber loop 630 has positive (in ps/nm×km) dispersion. A second arm on the first side of the coupler 620 produces the output signal from the NOLM 610. Another coupler 625 is used to launch a control pulse at optical wavelength $\lambda_2$ in one direction into the NOLM. A power control device 660, such as a fiber amplifier or attenuator, may be used to control the power of the control pulse. The NOLM 610 may additionally comprise a polarization control device 680. Finally, an optical filter 670 (which may be a bandpass, stop band, or edge filter) at the output of the NOLM 610 is used to reject signals at the optical wavelength $\lambda_2$ of the control pulse and to pass the resultant top hat pulse at the optical wavelength $\lambda_1$ of the CW optical signal. In the NOLM 610, the control pulse slides across the co-propagating counterclockwise CW signal due to dispersion and imprints a non-linear phase on the CW optical signal. The interference of the clockwise and counterclockwise optical signals at the coupler 620 produces the top hat output. The intensity of the top hat output is determined by the non-linear phase shift of the counter-clockwise beam.

The components of the NOLM 610 discussed above are generally well-known in the art. For example, 3 dB couplers are available from any number of commercial vendors, and no specific 3 dB coupler is preferred for embodiments of the present invention. The polarization control device 680 may be provided by devices and apparatus well-known in art and commercially available, such as a wave plate. Further, the polarization control device 680 may be located any where along the fiber 630. Optical filters well known in the art may be used to provide the filter 670.

The coupler 625 used to launch the control pulse into the loop may also be provided by a commercially available device. For example, the coupler 625 may comprise a 10 dB coupler, such that the CW optical signal propagating within the loop suffers 10% attenuation at the coupler, while the control pulse suffers 90% attenuation. A 20 dB coupler may be used, such that the CW optical signal suffers only 1% attenuation, while the control pulse suffers 99% attenuation. A 3 dB coupler, which provides 50% attenuation of both the CW optical signal and the control pulse, may also be used. Alternatively, a polarization coupler may be used to launch the control pulse into the loop at a polarization opposite that of the CW optical signal.

Typical parameters for a top hat generator that is controllable by a first order soliton are described as follows. As described above, the peak power for achieving soliton regime is given by Equation (3) above. The dispersion of a standard, that is, non dispersion-shifted, optical fiber is $D \approx 17$ ps/nm×km. A typical non-linear fiber constant is $\gamma = 1.5$ $W^{-1}km^{-1}$. With a control pulse having a duration $t_p = 1$ ps and an optical wavelength of $\lambda = 1.55$ $\mu$m, Equation (3) yields a peak power of $P_c \approx 40$ W. The dispersion of a positive dispersion-shifted fiber is typically $D \approx 3-6$ ps/nm×km, resulting in a peak power of $P_c \approx 10$W. These peak powers correspond to average powers of $P_{avg} \approx 400$ mW and $P_{avg} \approx 100$ mW, respectively, for control pulses with a 10 Gpulse/s repetition rate. Control of the power of the control pulses may be provided by commercially available eridium-doped fiber amplifiers or attenuators, as discussed above.

All of the optical power of the CW optical signal coupled into the NOLM is not output from the NOLM in the peak of the top hat pulse. That is, the NOLM has a conversion efficiency of less than 1. The conversion efficiency for the NOLM controlled by solitons may be calculated as follows.

The peak non-linear phase shift acquired by the CW beam co-propagating with the control pulse is given approximately by:

$$\varphi_{NL}^{max} = \frac{4P_c \gamma t_0}{|1/v_s - 1/v_c|} \qquad \text{Eq. (4)}$$

where $v_s$ and $v_c$ are the group velocities of the control pulse and continuous wave beams, respectively. The denominator of Equation (4) can be calculated as follows:

$$|1/v_s - 1/v_c| \approx |(d^2k/d\omega^2)\Delta\omega| = 2\pi|\beta_2|\Delta\lambda/\lambda \qquad \text{Eq. (5)}$$

Therefore, the peak non-linear phase shift can be shown to be:

$$\varphi_{NL}^{max} = \frac{4P_c \gamma t_0 \lambda^2}{2\pi|\beta_2|\Delta\lambda} \qquad \text{Eq. (6)}$$

For the fundamental soliton, as described above, $P_c = |\beta_2|/t_0^2$, so the peak non-linear phase shift for the CW beam co-propagating with the soliton control pulse is given by:

$$\varphi_{sol}^{max} = \frac{2\lambda^2}{\pi c \Delta\lambda t_0} = \frac{4\ln(\sqrt{2}+1)\lambda^2}{\pi c \Delta\lambda t_{FWHM}} \qquad \text{Eq. (7)}$$

Assuming the control pulse has a transform limited, sech² spectral shape, the spectral width of the control pulse is related to the pulse duration of the control pulse as follows:

$$\delta\lambda_{FWHM} = \frac{(2\ln(\sqrt{2}+1)/\pi)^2 \lambda^2}{t_{FWHM} c}. \qquad \text{Eq. (8)}$$

Therefore, the peak non-linear phase may be found as follows:

$$\varphi_{sol}^{max} = \frac{\pi}{\ln(\sqrt{2}+1)} \frac{\delta\lambda_{FWHM}}{\Delta\lambda} = 3.56 \frac{\delta\lambda_{FWHM}}{\Delta\lambda}. \qquad \text{Eq. (9)}$$

Equation (9) shows that the phase shift at the peak in a soliton-controlled NOLM depends only on the relative detuning of the control pulse from the CW beam. Thus, the peak phase-shift depends upon the relative difference between the optical wavelength of the CW beam and the optical wavelength of the control pulse.

Figure 7:
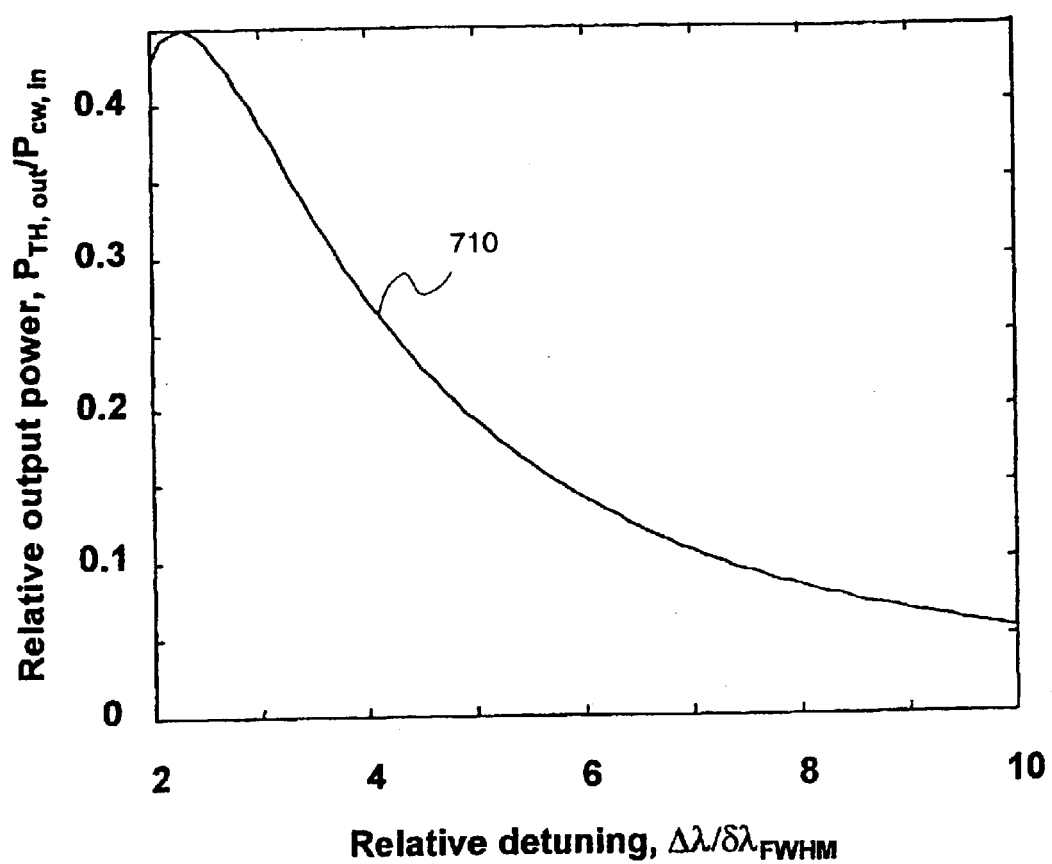
FIG. 7 is a graph of the conversion efficiency versus relative de-tuning of an embodiment of a top hat generator according to the present invention where the duty cycle of the output pulses is assumed to be 0.45.

The peak and average output power of the top hat output are given by:

$$P_{TH}^{peak} = P_{cw}\sin^2(\varphi_{sol}^{max}) \qquad \text{Eq. (10)}$$

$$P_{TH}^{av} = P_{cw}\sin^2(\varphi_{sol}^{max})Dc \qquad \text{Eq. (11)}$$

where Dc is the duty cycle of the top hat pulse, that is, the duration of the top hat pulse Δt divided by the pulse-to-pulse period. As described above, optimal performance of an optimal PPM receiver according to embodiments of the present invention is achieved if the duty cycle is close to 50%. Therefore, Dc should be less than or equal to 0.5. FIG. 7 shows the conversion efficiency 710 of the embodiment of a top hat generator using a soliton control pulse versus relative detuning for Dc=0.45.

To determine the output power and the conversion efficiency of the top hat generator using a soliton control pulse, an acceptable relative detuning value $\Delta\lambda/\delta\lambda_{FWHM}$ should be found. An acceptable relative detuning value is determined by the amount of control power leaking through the filter disposed at the output of the NOLM. In the calculations shown below, it is assumed that the control pulse has a sech² spectral shape and the filter has a top hat band shape. The cross-talk power of the control pulse after the filter may be calculated as follows:

$$P_{xtalk} = \frac{0.5 P_c \int_{\lambda_1}^{\lambda_2} \sec h^2 [2\ln(\sqrt{2}+1)(x/\delta\lambda_{FWHM})] dx}{\int_{-\infty}^{\infty} \sec h^2 [2\ln(\sqrt{2}+1)(x/\delta\lambda_{FWHM})] dx} \qquad \text{Eq. (12)}$$

where $\lambda_1$ and $\lambda_2$ are the lower and upper bounds of the filter window, respectively.

Equation (12) can be simplified as:

$$P_{xtalk} = \frac{P_c \int_{2\ln(\sqrt{2}+1)(\lambda_1/\delta\lambda_{FWHM})}^{2\ln(\sqrt{2}+1)(\lambda_2/\delta\lambda_{FWHM})} \sec h^2 y \, dy}{\int_{-\infty}^{\infty} \sec h^2 y \, dy} \qquad \text{Eq. (13)}$$

which provides:

$$P_{xtalk} = 0.25 P_c [th(2\ln(\sqrt{2}+1)(\lambda_2/\delta\lambda_{FWHM})) - th(2\ln(\sqrt{2}+1)(\lambda_1/\delta\lambda_{FWHM}))] \qquad \text{Eq. (14)}$$

Assuming that the upper and lower bounds of the filter window are defined as follows: $\lambda_{1,2} = \lambda_0 \pm \Delta\lambda/2$, the cross talk power of the control pulse is:

$$P_{xtalk} = \frac{0.5 P_c sh(2\ln(\sqrt{2}+1))}{ch(4\ln(\sqrt{2}+1)\Delta\lambda/\delta\lambda_{FWHM}) + ch(2\ln(\sqrt{2}+1))} \qquad \text{Eq. (15)}$$

Figure 8:
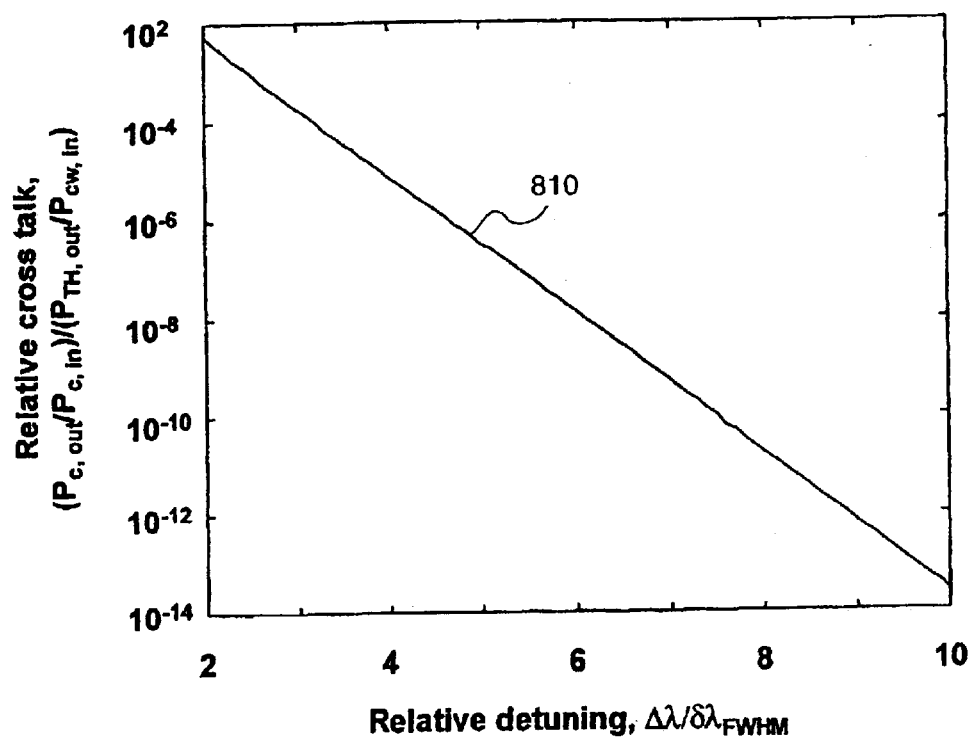
FIG. 8 is a graph of the relative cross-talk versus relative de-tuning of an embodiment of a top hat generator according to the present invention.

FIG. 8 shows the relative cross-talk 810, that is, the fraction of the control power leaking through the filter divided by the conversion efficiency, plotted versus the relative detuning.

The optimum detuning is determined from the system requirements for the maximum cross talk. If, for example, the relative cross talk should not exceed $10^4$-, the relative detuning should be approximately $\Delta\lambda/\delta\lambda_{FWHM} \approx 3$ (see FIG. 8 or Equation (15)), which gives a conversion efficiency $P_{TH,out}/P_{CW,in} \approx 0.39$ (see Equation (6) and FIG. 7). If higher cross-talk is tolerated, smaller detuning may be chosen, resulting in a higher conversion efficiency. For example, detuning of $\Delta\lambda/\delta\lambda_{FWHM} \approx 2.27$ may be desirable, which provides a maximum conversion efficiency of 45% and a cross-talk of $2 \times 10^{-3}$. In this case, the output of the top hat generator will be independent of small variations in the control power, i.e., it will work as an optical limiter. This result can be seen from Equation (11), which shows that the peak power of the top hat generator is dependent on $\sin^2 (\phi_{sol}^{max})$. Therefore, if the generator is near the maximum efficiency, an increase or decrease in $\phi_{sol}^{max}$ will only result in a slight decrease in output power.

The length of the fiber required for the NOLM is determined from the required pulse duration of the output top hat pulse. As described above, it is desirable to have a modulation index up to 0.5, therefore, top hat pulses having a relatively long duration are desired. However, the pulse repetition rate will limit the spacing and, therefore, the duration of the top hat pulses. The length of the fiber given a desired top hat pulse duration may be found from:

$$\Delta t = L(1/v_{cw} - 1/v_c) = L|(d^2k/d\omega^2)|\Delta\omega| = LD\Delta\lambda \qquad \text{Eq. (16)}$$

For example, in an NOLM for which relative detuning of $\Delta\lambda/\delta\lambda_{FWHM} \approx 3$ is assumed and with a standard dispersion of D=17 ps/nm×km and a control pulse width of $t_p$=1 ps ($\delta\lambda_{FWHM}$=2.5 nm), a fiber length of L=1.95 km is needed for a pulse duration of Δt=50 ps.

From the foregoing description, it will be apparent that embodiments of the present invention have a number of advantages, some of which have been described herein, and others of which are inherent in the embodiments of the invention described herein. Also, it will be understood that modifications can be made to the method and apparatus described herein without departing from the teachings of subject matter described herein. As such, the invention is not to be limited to the described embodiments except as required by the appended claims.

What is claimed is:

1. A top hat pulse generator receiving a continuous wave optical signal at a first wavelength and a pulsed optical signal at a second wavelength and generating top hat optical pulses at the first wavelength, said top hat pulse generator comprising:

an optical coupler having a first side with a first arm and a second arm and a second side having a third arm and a fourth arm, the first arm adapted to receive said continuous wave optical signal and to launch said continuous wave optical signal into said third arm and said fourth arm;

an optical fiber having a first end and a second end, said first end disposed to receive optical energy from said third arm and to transmit optical energy to said third arm and said second end disposed to receive optical energy from said fourth arm and to transmit optical energy to said fourth arm, said optical fiber having a positive dispersion supporting optical solitons;

an optical filter receiving optical energy from said second arm; and a control pulse coupler positioned to launch optical energy into the optical fiber, said control pulse coupler having an input adapted to receive said pulsed optical signal;

wherein said pulsed optical signal has an optical peak power and the optical peak power is controlled to that of a first order soliton.

2. The top hat pulse generator of claim 1, wherein said optical peak power is controlled to counteract dispersion of control pulses propagating within said optical fiber.

3. The top hat pulse generator of claim 1, wherein said optical coupler launches two counter-propagating beams into said optical fiber.

4. The top hat pulse generator of claim 1, wherein said optical coupler comprises a 3 dB coupler.

5. The top hat pulse generator of claim 1, wherein said control pulse coupler launches optical energy into the optical fiber in a single direction.

6. The top hat pulse generator of claim 1, wherein said optical filter substantially passes optical energy at said first wavelength and substantially attenuates optical energy at said second wavelength.

7. The top hat pulse generator of claim 1, wherein said pulsed optical signal comprises optical pulses each having a full-width half-maximum pulse duration of $t_{FWHM}$, said optical fiber has a non-linear fiber constant of $\gamma$ and a fiber dispersion of D, said second wavelength is represented by $\lambda$, c represents the speed of light, and said optical peak power $P_c$ is given by the following equation:

$$P_c = \frac{3.11\lambda^2 D}{2\pi c \gamma t_{FWHM}^2}.$$

8. The top hat pulse generator of claim 1, further comprising an amplifier coupled to said input of said control pulse coupler.

9. The top hat pulse generator of claim 1, further comprising an attenuator coupled to said input of said control pulse coupler.

10. The top hat pulse generator of claim 1, further comprising a polarization control device disposed to control polarization within said optical fiber.

11. The top hat pulse generator of claim 1, wherein said top hat optical pulses have a duty cycle less than or equal to 0.5.

12. The top hat pulse generator of claim 1, wherein said control pulse coupler comprises a coupler selected from a group consisting of a 3 dB coupler, a 10 dB coupler, a 20 dB coupler, and a polarization coupler.

13. A method for converting optical pulses at a first optical wavelength to top hat optical pulses at a second optical wavelength comprising the steps of:

generating a continuous wave optical signal at said second optical wavelength;

launching counter-propagating beams of said continuous wave optical signal into a loop of optical fiber from a coupler, said optical fiber having a positive dispersion supporting optical solitons and said counter-propagating waves interfering at said coupler;

launching said optical pulses into said loop of optical fiber, said optical pulses having a peak optical power;

controlling the peak optical power to a power of a first order soliton;

coupling optical energy out of said optical fiber at said coupler; and filtering said optical energy to suppress optical energy at said first optical wavelength and to pass optical energy at said second optical wavelength to produce top hat optical pulses at said second optical wavelength.

14. The method of claim 13, wherein said step of controlling the peak optical power comprises controlling the peak optical power to counteract dispersion of control pulses propagating within said optical fiber.

15. The method of claim 13, wherein said coupler comprises a 3 dB coupler.

16. The method of claim 13, wherein said step of launching said optical pulses into said loop of optical fiber comprises launching said optical pulses in a single direction in said optical fiber.

17. The method of claim 13, wherein said optical pulses each have a full-width half-maximum pulse duration of $t_{FWHM}$, said optical fiber has a non-linear fiber constant of $\gamma$ and a fiber dispersion of D, said second optical wavelength is represented by $\lambda$, c represents the speed of light, and said peak optical power $P_c$ is controlled according to the following equation:

$$P_c = \frac{3.11\lambda^2 D}{2\pi c \gamma t_{FWHM}^2}.$$

18. The method of claim 13 wherein the step of controlling the peak optical power comprises coupling the optical pulses to an amplifier.

19. The method of claim 13 wherein the step of controlling the peak optical power comprises coupling the optical pulses to an attenuator.

20. The method of claim 13, further comprising the step of controlling the polarization of optical energy propagating within said optical fiber.

21. The method of claim 13, wherein said top hat optical pulses have a duty cycle less than or equal to 0.5.

22. An apparatus for detecting a pulse position modulated optical signal comprising:

a clock source providing a pulsed optical clock signal synchronized to said pulse position modulated optical signal;

a continuous wave optical source producing a continuous wave optical signal;

a first optical top hat pulse generator receiving said continuous wave optical signal and said pulse position modulated optical signal and producing a first optical top hat output signal, wherein a peak power of said pulse position modulated optical signal is adjusted to that of a first order soliton;

a second optical top hat pulse generator receiving said continuous wave signal and said pulsed optical clock signal and producing a second optical top hat output signal, wherein a peak power of said pulsed optical clock signal is adjusted to that of a first order soliton; and an overlap-to-electric converter receiving said first optical top hat signal and said second optical top hat signal and producing an electric signal proportional to an overlap amount between said first optical top hat signal and said second optical top hat signal.

23. The apparatus according to claim 22, wherein said overlap-to-electric converter comprises a coherent correlator, a sum frequency generator, or a four-wave mixer.

24. The apparatus according to claim 22, wherein at least one optical top hat pulse generator comprises:

an optical coupler having a first side with a first arm and a second arm and a second side having a third arm and a fourth arm, the first arm adapted to receive said continuous wave optical signal and to launch said continuous wave optical signal into said third arm and said fourth arm;

an optical fiber having a first end and a second end, said first end disposed to receive optical energy from said third arm and to transmit optical energy to said third arm and said second end disposed to receive optical energy from said fourth arm and to transmit optical energy to said fourth arm, said optical fiber having a positive dispersion supporting optical solitons;

an optical filter receiving optical energy from said second arm; and a control pulse coupler positioned to launch optical energy into the optical fiber, said control pulse coupler having an input adapted to receive said pulse position modulated signal or said pulsed optical clock signal.

25. The apparatus according to claim 24, wherein said optical coupler comprises a 3 dB coupler.

26. The apparatus according to claim 24, wherein the at least one optical top hat pulse generator further comprises an amplifier coupled to said input of said control pulse coupler.

27. The apparatus according to claim 24, wherein the at least one optical top hat pulse generator further comprises an attenuator coupled to said input of said control pulse coupler.

28. The apparatus according to claim 24, wherein the at least one optical top hat pulse generator further comprises a polarization control device coupled to said optical fiber.

29. The apparatus according to claim 24, wherein the pulse position modulated optical signal or the pulsed optical clock signal comprises optical pulses each having a full-width half-maximum pulse duration of $t_{FWHM}$, said optical fiber has a non-linear fiber constant of $\gamma$ and a fiber dispersion of D, said optical pulses being at an optical wavelength $\lambda$, c represents the speed of light, and the peak power $P_c$ of said pulse position modulated optical signal or said pulsed optical clock signal is given by the following equation:

$$P_c = \frac{3.11 \lambda^2 D}{2\pi c \gamma t_{FWHM}^2}.$$

30. The apparatus according to claim 24, wherein at least one optical top hat signal has a duty factor less than or equal to 0.5.

31. A method for detecting a pulse position modulated optical signal comprising the steps of:

receiving said pulse position modulated optical signal;

providing a stream of optical clock pulses;

generating a continuous wave optical signal having an optical wavelength different than an optical wavelength of said pulse position modulated optical signal or said optical clock pulses;

applying said continuous wave optical signal to a first non-linear optical loop mirror;

coupling said pulse position modulated optical signal into said first non-linear optical loop mirror;

controlling a peak power of said pulse position modulated optical signal to be at a power of a first order soliton;

applying said continuous wave optical signal to a second non-linear optical loop mirror;

coupling said stream of optical clock pulses into said second non-linear optical loop mirror;

controlling a peak power of said stream of optical clock pulses to be at a power of a first order soliton;

coupling a first output optical signal out of said first non-linear optical loop mirror;

filtering said first output optical signal with a filter that transmits at and around said optical wavelength of said continuous wave optical signal and rejects at and around said optical wavelength of said pulse position modulated signal to produce a first top hat signal;

coupling a second output optical signal out of said second non-linear optical loop mirror;

filtering said second output optical signal with a filter that transmits at and around said optical wavelength of said continuous wave optical signal and rejects at and around said optical wavelength of said optical clock pulses to produce a second top hat signal;

detecting the amount of overlap between the first top hat signal and the second top hat signal; and producing an electrical signal proportional to the amount of overlap.

32. The method of claim 31 wherein the step of controlling a peak power of said pulse position modulated optical signal to be at a power of a first order soliton comprises coupling said pulse position modulated optical signal to an amplifier and/or an attenuator.

33. The method of claim 31 wherein the step of controlling a peak power of said stream of optical clock pulses comprises coupling said stream of optical pulses to an amplifier and/or an attenuator.

34. The method of claim 31, wherein:

the step of applying said continuous wave optical signal to a first non-linear optical loop mirror comprises launching counter-propagating beams of said continuous wave optical signal into a loop of optical fiber from an optical coupler, said optical fiber having a positive dispersion supporting optical solitons and said counter-propagating waves interfering at said optical coupler;

the step of coupling said pulse position modulated optical signal into said first non-linear optical loop mirror comprises launching said pulse position modulated optical signal into said loop of optical fiber; and the step of controlling a peak power of said pulse position modulated optical signal to be at a power of a first order soliton comprises controlling peak power of the pulse position modulated signal according to the following equation:

$$P_c = \frac{3.11\lambda^2 D}{2\pi c \gamma t_{FWHM}^2}$$

wherein said peak power of the pulse position modulated optical signal is represented by $P_c$, optical pulses of said pulse position modulated optical signal have a full-width half-maximum pulse duration of $t_{FWHM}$, said optical fiber has a non-linear fiber constant of $\gamma$ and a fiber dispersion of D, said optical wavelength of said pulse position modulated optical signal is represented by $\lambda$, and c represents the speed of light.

35. The method of claim 31, wherein:
the step of applying said continuous wave optical signal to a second non-linear optical loop mirror comprises launching counter-propagating beams of said continuous wave optical signal into a loop of optical fiber from an optical coupler, said optical fiber having a positive dispersion supporting optical solitons and said counter-propagating waves interfering at said optical coupler;
the step of coupling said stream of optical clock pulses into said second non-linear optical loop mirror comprises launching said stream of optical clock pulses into said loop of optical fiber; and
the step of controlling a peak power of said stream of optical clock pulses to be at a power of a first order soliton comprises controlling the peak power of said stream of optical clock pulses according to the following equation:

$$P_c = \frac{3.11\lambda^2 D}{2\pi c \gamma t_{FWHM}^2}$$

wherein said peak power of said stream of optical clock pulses is represented by $P_c$, optical pulses of said stream of optical clock pulses have a full-width half-maximum pulse duration of $t_{FWHM}$, said optical fiber has a non-linear fiber constant of $\gamma$ and a fiber dispersion of D, said optical wavelength of said stream of optical clock pulses is represented by $\lambda$, and c represents the speed of light.

36. The method of claim 34, wherein the optical coupler comprises a 3 dB optical coupler.

37. The method of claim 35, wherein the optical coupler comprises a 3 dB optical coupler.

38. The method of claim 34, further comprising the step of controlling the polarization of optical energy propagating within said optical fiber.

39. The method of claim 35, further comprising the step of controlling the polarization of optical energy propagating within said optical fiber.

40. The method of claim 31, wherein at least one top hat signal of the first top hat signal and the second top hat signal has a duty cycle less than or equal to 0.5.

* * * * *